US012607580B1

(12) United States Patent
Oka et al.

(10) Patent No.: US 12,607,580 B1
(45) Date of Patent: Apr. 21, 2026

(54) SAMPLE HOLDER

(71) Applicant: Rigaku Corporation, Akishima (JP)

(72) Inventors: Yohei Oka, Takatsuki (JP); Koichi Aoyagi, Takatsuki (JP); Yasujiro Yamada, Takatsuki (JP)

(73) Assignee: RIGAKU CORPORATION, Tokyo (JP)

( * ) Notice: Subject to any disclaimer, the term of this patent is extended or adjusted under 35 U.S.C. 154(b) by 28 days.

(21) Appl. No.: 18/873,315

(22) PCT Filed: Nov. 13, 2023

(86) PCT No.: PCT/JP2023/040695
§ 371 (c)(1),
(2) Date: Dec. 9, 2024

(87) PCT Pub. No.: WO2024/171542
PCT Pub. Date: Aug. 22, 2024

(30) Foreign Application Priority Data

Feb. 16, 2023 (JP) ................................. 2023-022206

(51) Int. Cl.
*G01N 23/2204* (2018.01)
*G01N 23/223* (2006.01)
(52) U.S. Cl.
CPC ....... *G01N 23/2204* (2013.01); *G01N 23/223* (2013.01)
(58) Field of Classification Search
CPC .... G01N 1/28; G01N 23/223; G01N 23/2204; G01N 1/286; G01N 23/20025;
(Continued)

(56) References Cited

U.S. PATENT DOCUMENTS 4,409,854 A * 10/1983 Solazzi ............ G01N 23/20025
422/547
2021/0048398 A1* 2/2021 Ito .................... G01N 23/20025

FOREIGN PATENT DOCUMENTS

CN 209784230 U 12/2019
CN 210376101 U 4/2020
(Continued)

OTHER PUBLICATIONS

Search Report of Oct. 7, 2025, for corresponding EP Patent Application No. 23922875.2, pp. 1-6.
(Continued)

*Primary Examiner* — Irakli Kiknadze
(74) *Attorney, Agent, or Firm* — HEA Law PLLC

(57) ABSTRACT

Provided is a sample holder which facilitates replacement work of a sample by using a resin member, and that can suppress deterioration of the resin member due to X-rays. The sample holder for X-ray fluorescence analysis includes: a cylindrical member; a saucer; an elastic member; a resin member, which includes a bow part; and a bottom plate. The cylindrical member, the saucer, and the bottom plate are each made of a metal. The bow part includes a claw portion and a pressed portion. The cylindrical member includes a fitting portion and an exposure portion. The claw portion fit to the fitting portion. The pressed portion exposed to an outside through the exposure portion. The resin member is arranged between the saucer and the bottom plate, and portions of the resin member other than the pressed portion are surrounded by the cylindrical member, the saucer, and the bottom plate.

9 Claims, 6 Drawing Sheets

(58) Field of Classification Search

CPC ......... G01N 23/2005; G01N 2223/637; G01N 2223/62; G01N 2223/309; G01N 2223/056; G01N 2223/076; G01N 2223/1016; G01N 2223/307; G01N 23/202; G01N 23/201; G01N 2223/623; G01N 2223/627; G01N 2223/106; G01N 15/1425; G01N 15/1404; G01N 15/1436; G01N 15/1459; G01N 15/1434; G01N 23/207; A61B 34/73; A61M 31/002; G01T 7/02; G21F 7/02

USPC ........................................................ 378/208

See application file for complete search history.

(56) References Cited

FOREIGN PATENT DOCUMENTS

| | | | |
|---|---|---|---|
| CN | 210514131 U | 5/2020 |
| CN | 221899091 U | 10/2024 |
| JP | S569042 U | 1/1981 |
| JP | S5980738 U | 5/1984 |
| JP | H0658350 U | 8/1994 |
| JP | H10232208 A | 9/1998 |
| JP | H1123495 A | 1/1999 |
| JP | 2004245745 A | 9/2004 |
| JP | 2013061306 A | 4/2013 |
| JP | 3203166 U | 3/2016 |
| JP | 2016085066 A | 5/2016 |
| JP | 3241595 U | 4/2023 |

OTHER PUBLICATIONS

International Search Report of Dec. 12, 2023 for International Patent Application PCT/JP2023/040695 with English translation, pp. 1-4.
Office Action of Nov. 5, 2024, for corresponding JP application No. 2023-022206 with partial English translation, pp. 1-3.
Office Action of Mar. 26, 2025, for corresponding CN Patent Application No. 202380048054.2, pp. 1-7.

* cited by examiner

100

(a)

(b)

SAMPLE HOLDER

CROSS REFERENCE TO RELATED APPLICATIONS

This application is a National Stage of International Application No. PCT/JP2023/040695 filed on Nov. 13, 2023, which claims priority from Japanese Patent Application 2023-022206, filed on Feb. 16, 2023. The contents of the above document is incorporated herein by reference in its entirety.

TECHNICAL FIELD

The present invention relates to a sample holder.

BACKGROUND ART

As a device for measuring elements contained in a sample, or a concentration of the elements, there has been given an X-ray fluorescence spectrometer. At the time of performing measurement using the X-ray fluorescence spectrometer, a sample holder is used in some cases. For example, there has been known a sample holder having a configuration of covering a sample with a pressing lid from above in order to fix a sample placed on a saucer inside a case (see Patent Literature 1 to Patent Literature 3 listed below).

CITATION LIST

Patent Literature

[PTL 1] JP 59-80738 U
[PTL 2] JP 56-009042 U
[PTL 3] JP 6-58350 U

SUMMARY OF INVENTION

Technical Problem

In the related-art sample holder, as a method of fixing the case and the pressing lid, there have been employed a method of threaded engagement (Patent Literature 1 listed above), a method of screw fastening (Patent Literature 2 listed above), and a method of fitting plungers into grooves (Patent Literature 3 listed above).

In a case of the configuration of fixing by the threaded engagement or the screw fastening, it has been required to repeatedly turn the pressing lid or screws every time replacement of a sample is performed, which requires time and effort. Further, in the threaded engagement or the screw fastening, there has been a possibility of looseness being caused by vibration, which may result in disassembly of the sample holder inside the X-ray fluorescence spectrometer. Also in a case of the configuration of fitting the plungers into the grooves, there has been a possibility of the plungers coming away from the grooves inside the X-ray fluorescence spectrometer to cause disassembly of the sample holder, and there has also been a problem in that components are expensive.

The present disclosure has been made in view of the above-mentioned problems, and has an object to provide a sample holder which facilitates replacement work of a sample by using a resin member and can suppress deterioration of the resin member due to X-rays.

Solution to Problem (1) According to one aspect of the present disclosure, there is provided a sample holder for X-ray fluorescence analysis, including: a cylindrical member having an upper end surface with a hole partially formed therein, and a lower end which is opened; a saucer, which is arranged inside the cylindrical member, and on which a sample is to be placed; an elastic member configured to urge the saucer upward; a resin member, which includes a bow part and is configured to come into contact with a lower end of the elastic member; and a bottom plate arranged below the resin member. The cylindrical member, the saucer, and the bottom plate are each made of a metal. The bow part includes a claw portion provided at an end portion, and a pressed portion to be pressed inward, and is configured to be elastically deformed by pressing the pressed portion. The cylindrical member includes a fitting portion which allows the claw portion to be fitted to the fitting portion, and an exposure portion which allows the pressed portion to be exposed to an outside through the exposure portion. The resin member is arranged between the saucer and the bottom plate, and portions of the resin member other than the pressed portion are surrounded by the cylindrical member, the saucer, and the bottom plate.

(2) In the above-mentioned aspect of the present disclosure, the cylindrical member includes a tubular body having a cylindrical shape, and an upper surface body having a hole formed therein.

(3) In the above-mentioned aspect of the present disclosure, the cylindrical member is integrally formed.

(4) In the above-mentioned aspect of the present disclosure, the saucer includes, in a surface of the saucer on which the sample is to be placed, a recess portion in which the sample is to be placed.

(5) In the above-mentioned aspect of the present disclosure, the saucer includes a protruding portion on a bottom surface. The elastic member has an upper end which is to be fitted onto the protruding portion of the saucer.

(6) In the above-mentioned aspect of the present disclosure, the resin member includes a locking portion having a claw-shape. The elastic member has a lower end which is to be locked by the locking portion of the resin member.

(7) In the above-mentioned aspect of the present disclosure, the cylindrical member, the saucer, and the bottom plate are each made of an alloy mainly containing aluminum.

(8) In the above-mentioned aspect of the present disclosure, the fitting portion is a recess which allows the claw portion to be fitted into the recess.

(9) In the above-mentioned aspect of the present disclosure, the exposure portion is a cutout which allows the pressed portion to be exposed to the outside through the cutout.

Advantageous Effects of Invention

According to the present disclosure, the sample holder which facilitates replacement work of the sample and has no possibility of being disassembled inside an X-ray fluorescence spectrometer can be provided.

DESCRIPTION OF EMBODIMENTS

Figure 1:
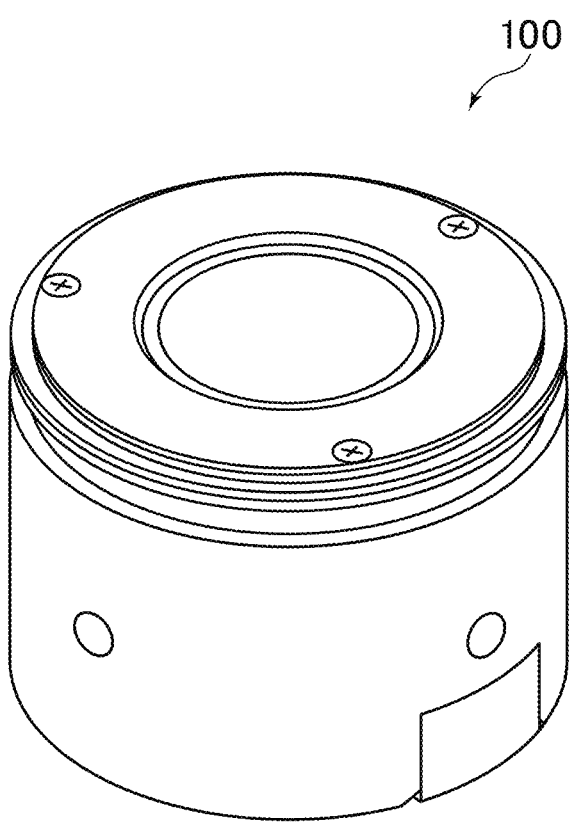
FIG. 1 is a bird's-eye view of a sample holder.
Figure 2:
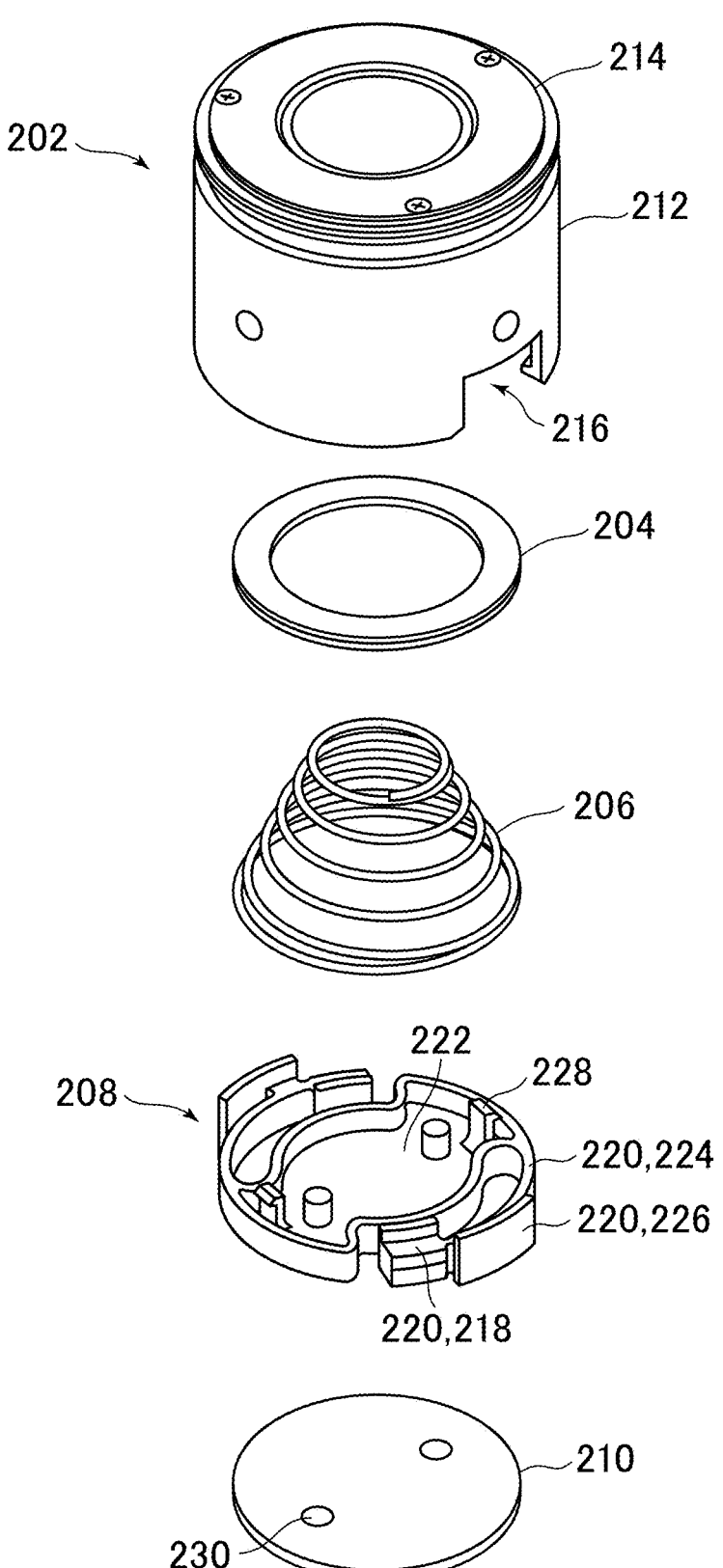
FIG. 2 is a view for illustrating components of the sample holder.
Figure 3:
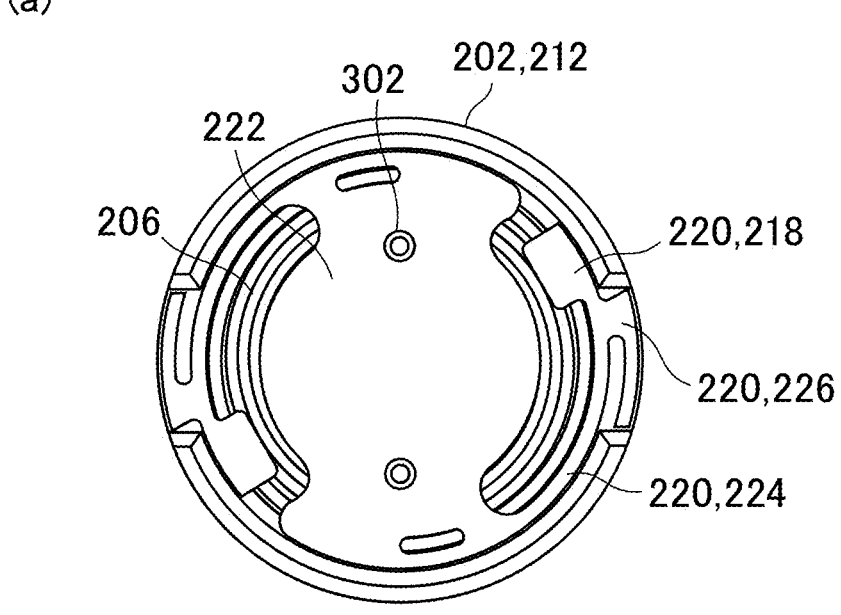
FIG. 3 are bottom views of the sample holder.
Figure 3:
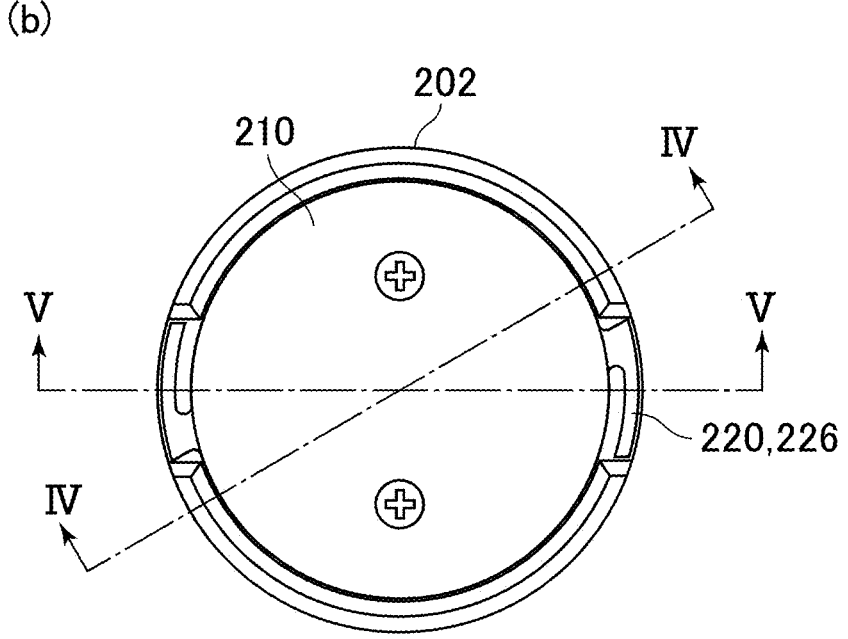
Figure 4:
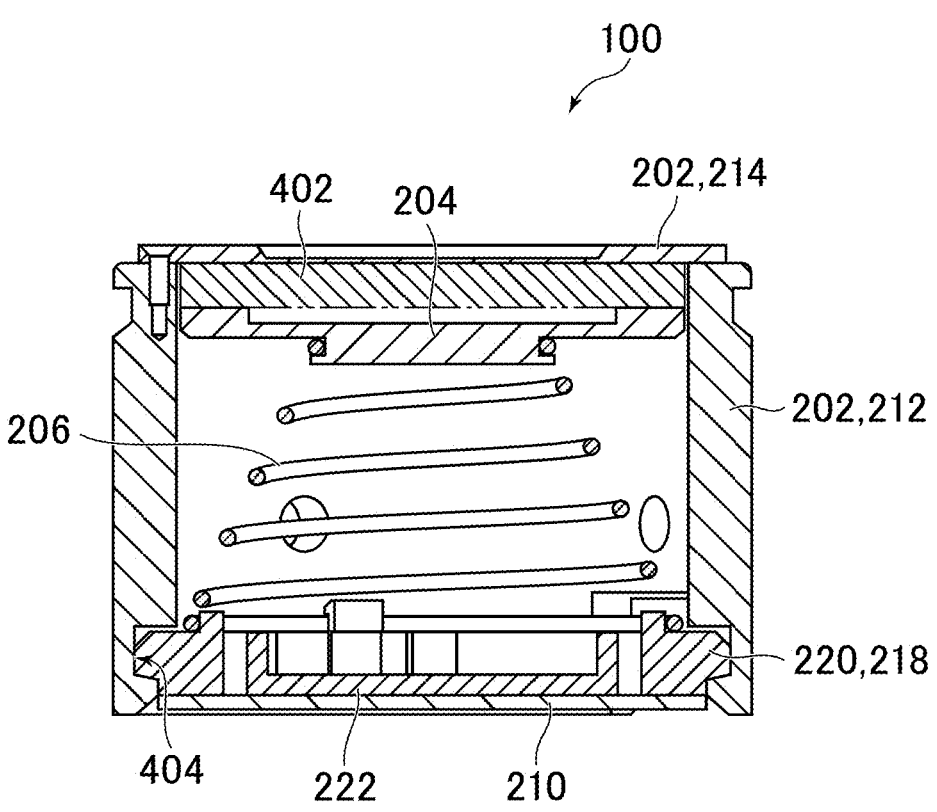
FIG. 4 is a view illustrating a cross section of the sample holder taken along the line IV-IV.
Figure 5:
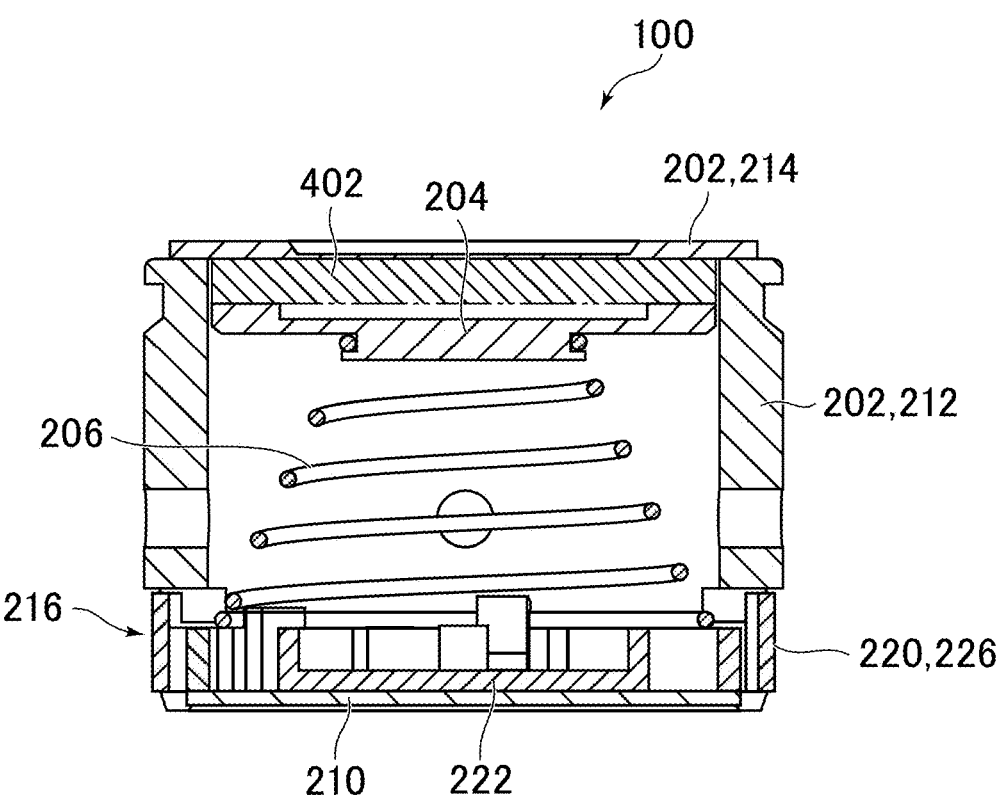
FIG. 5 is a view illustrating a cross section of the sample holder taken along the line V-V.

Now, description is given of a preferred embodiment (hereinafter referred to as "embodiment") for implementing the present invention, with reference to the drawings. FIG. 1 is a bird's-eye view of a sample holder 100. FIG. 2 is a view illustrating components of the sample holder 100 and shows a state in which the sample holder has been disassembled in an up-and-down direction. FIG. 3(a) is a bottom view of the sample holder 100, from which a bottom plate 210 has been removed. FIG. 3(b) is a bottom view of the sample holder 100, to which the bottom plate 210 has been attached. FIG. 4 is a view illustrating a cross section taken along the line IV-IV of FIG. 3(b). FIG. 5 is a view illustrating a cross section taken along the line V-V of FIG. 3(b). As illustrated in FIG. 2, the sample holder 100 includes a cylindrical member 202, a saucer 204, an elastic member 206, a resin member 208, and a bottom plate 210.

The cylindrical member 202 has an upper end surface with a hole partially formed therein, and a lower end which is opened. Further, the cylindrical member 202 includes fitting portions 404 which allow claw portions 218 (described later) to be fitted into the fitting portions 404, respectively, and exposure portions 216 which each allow a part of each of bow parts 220 (described later) to be exposed to an outside through the exposure portion 216. Specifically, for example, the cylindrical member 202 includes a tubular body 212 having a cylindrical shape, and an upper surface body 214 having a hole formed therein, and has a configuration such that the upper surface body 214 is arranged on the tubular body 212 and fixed thereto with screws. As illustrated in FIG. 1 and FIG. 2, the upper surface body 214 is formed into a disk-shape, and has a hole in a center portion, through which a sample 402 is to be exposed. The upper surface body 214 is a so-called sample mask for preventing unnecessary X-rays being applied to a portion of the sample 402 which is not to be subjected to analysis. The cylindrical member 202 may be formed by replacing the upper surface body 214 with an upper surface body having a different hole diameter and attaching the replaced upper surface body 214 to the tubular body 212. As illustrated in FIG. 4, each of the fitting portions 404 is, for example, a recess which allows the claw portion 218 to be fitted into the recess. Further, as illustrated in FIG. 1 and FIG. 2, each of the exposure portions 216 is a cutout which allows a part of the bow part 220 to be exposed to the outside. As illustrated in FIG. 1 and FIG. 2, the tubular body 212 may have holes in a side surface thereof, which each function as an air hole at the time of performing measurement under a vacuum environment, but is not required to have such holes. Further, the cylindrical member 202 may be integrally formed without separating the tubular body 212 and the upper surface body 214 from each other.

The saucer 204 is arranged inside the cylindrical member 202, and the sample 402 is to be placed on the saucer 204. Specifically, the saucer 204 has a disk-shape having an outer diameter substantially equal to an inner diameter of the tubular body 212. Further, as illustrated in FIG. 4, the saucer 204 has a protruding portion on a bottom surface thereof, which is to be fitted onto an upper end of the elastic member 206. Further, the saucer 204 may include, in a surface of the saucer 204 on which the sample 402 is to be placed, a recess portion in which the sample 402 is to be placed. In FIG. 4, the sample 402 is a solid and has a diameter larger than a diameter of the recess portion, and hence a space is present between the sample 402 and the saucer 204 (above the recess portion). When the sample 402 is powder or has a diameter smaller than the diameter of the recess portion, the sample 402 is placed in the recess portion.

The elastic member 206 is configured to urge the saucer 204 upward. Specifically, for example, as illustrated in FIG. 2 and FIG. 4, the elastic member 206 is a spring. The elastic member 206 has a lower end which is to be locked by locking portions 228 of the resin member 208. The elastic member 206 has an upper end which is to be fitted onto the protruding portion of the saucer 204. With this configuration, the elastic member 206 urges the saucer 204 toward the upper surface body 214.

The resin member 208 is made of a resin, and hence, can be inexpensively mass-produced. For example, the resin member 208 may be formed by injection molding of a polyether ether ketone (PEEK) resin having high mechanical strength and high resistance against X-rays as well. The resin member 208 includes the bow parts 220, which each include the claw portion 218 at an end portion and are to be elastically deformed inward by pressing, and is configured to come into contact with the lower end of the elastic member 206. Specifically, for example, as illustrated in FIG. 3(a), the resin member 208 is made of an elastically deformable resin, and includes a base part 222 located in the vicinity of a center of the resin member 208, and the bow parts 220 each extending from the base part 222 along an inner wall of the cylindrical member 202. Further, each of the bow parts 220 includes a curved portion 224 which is to be elastically deformed inward by pressing, the claw portion 218 provided at a distal end of the curved portion 224, and a pressed portion 226 to which a force is to be applied from the outside. Two bow parts 220 are symmetrically arranged with respect to the base part 222. As illustrated in FIG. 4, two claw portions 218 are respectively fitted into the recesses (fitting portions 404) formed in the tubular body 212, to thereby fix the resin member 208 to the cylindrical member 202. In this case, as illustrated in FIG. 5, two pressed portions 226 are exposed through the cutouts formed in the tubular body 212, respectively. The two pressed portions 226 are arranged respectively at positions facing each other with respect to a center of the base part 222, and are pressed inward by a user when the resin member 208 is to be detached from the cylindrical member 202. The curved portion 224 is formed to be thin so as to be elastically deformed inward by pressing. Accordingly, when the two pressed portions 226 are pressed inward, two curved portions 224 are each curved toward an inside of the cylindrical member 202. When the two curved portions 224 have each been curved toward the inside of the cylindrical member 202, the claw portions 218 are brought into a state of being detached from the recesses (fitting portions 404) formed in the tubular body 212, respectively. Separating the resin member 208 and the cylindrical member 202 from each other in this state enables the resin member 208 to be detached from the cylindrical member 202.

Further, the resin member 208 includes the locking portions 228 each having a claw-shape, and the lower end of the elastic member 206 is locked by the locking portions 228. Specifically, for example, as illustrated in FIG. 2, in the resin member 208, two claw-shaped locking portions 228 are provided respectively in the vicinity of end portions of a surface of the base part 222 which faces the elastic member 206. The two locking portions 228 are arranged so as to be separated from each other by a distance substantially equal to a diameter, which is on the resin member 208 side, of the elastic member 206 being the spring. A positional relationship between the elastic member 206 and the resin member 208 is fixed by the resin member 208 side of the elastic member 206 being locked by claws of the locking portions 228.

Further, the resin member 208 has screw holes 302 for fixing the bottom plate 210 on a side facing the bottom plate 210.

The bottom plate 210 is arranged below the resin member 208. Specifically, the bottom plate 210 has a disk-shape with a diameter substantially equal to an inner diameter of the cylindrical member 202. Further, the bottom plate 210 has holes 230 respectively at positions corresponding to the screw holes 302 formed in the resin member 208. With screws being inserted through the holes formed in the bottom plate 210 and the screw holes 302 formed in the resin member 208, the bottom plate 210 is fixed to the resin member 208.

The cylindrical member 202, the saucer 204, and the bottom plate 210 are each made of a metal. Specifically, for example, the cylindrical member 202, the saucer 204, and the bottom plate 210 are each made of an alloy mainly containing aluminum. An alloy mainly containing aluminum is lighter than stainless steel of which the related-art sample holder 100 is made, thereby enabling reduction in weight. The phrase "mainly containing aluminum" means, for example, that among elements constituting each of the cylindrical member 202, the saucer 204, and the bottom plate 210, aluminum is an element with the highest content in each of the cylindrical member 202, the saucer 204, and the bottom plate 210. Further, the phrase described above may mean, for example, that the content of aluminum contained in each of the cylindrical member 202, the saucer 204, and the bottom plate 210 is a predetermined proportion (for example, percent by mass concentration of 10%) or more.

As described above, the saucer 204 is fitted onto the elastic member 206, the elastic member 206 is locked by the resin member 208, and the bottom plate 210 is fixed to the resin member 208. Moreover, the claw portions 218 of the resin member 208 are fitted into the recesses (fitting portions 404) of the cylindrical member 202. Accordingly, the resin member 208 is fixed to the cylindrical member 202. The user can detach the resin member 208 from the cylindrical member 202 by separating the resin member 208 and the cylindrical member 202 from each other while pressing the pressed portions 226, and thus, can remove the sample 402 placed on the saucer 204. The work involved in separating the resin member 208 and the cylindrical member 202 from each other while pressing the pressed portions 226 is easier than the work of disassembling the sample holder 100 fixed with screws or through threaded engagement. Hence, according to the present disclosure, replacement of the sample 402 can be easily performed.

Figure 6:
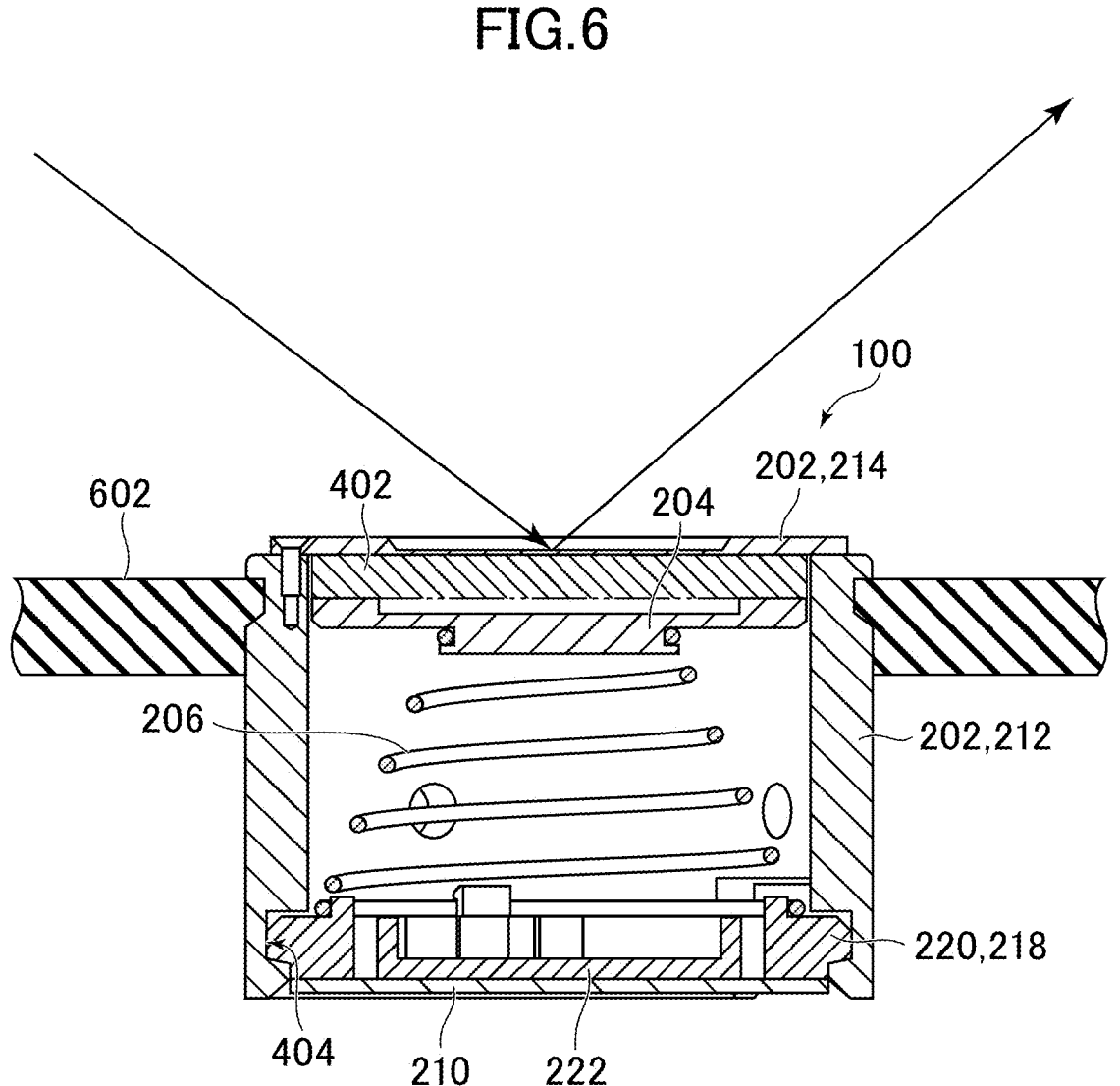
FIG. 6 is a view illustrating a state in which the sample holder has been installed in a sample stage for a tube-above optics X-ray fluorescence spectrometer.

Further, with the bottom plate 210 being arranged on a lower surface of the resin member 208, deterioration of the resin member 208 can be reduced. Specifically, FIG. 6 is a view for illustrating a state in which the sample holder 100 according to the present disclosure has been installed in a sample stage 602 for a tube-above optics X-ray fluorescence spectrometer. The sample holder 100 has been arranged in a hole formed in the sample stage 602. The resin member 208 is made of a resin so as to be elastically deformable, and hence, deterioration thereof due to X-ray exposure would be more prominent than that of other component members made of a metal. However, according to the present disclosure, the resin member 208 is arranged between the saucer 204 and the bottom plate 210, and portions of the resin member 208 other than the pressed portions 226 are surrounded by the cylindrical member 202, the saucer 204, and the bottom plate 210. Further, the pressed portions 226 are arranged at a lower end of the sample holder 100, and hence, the pressed portions 226 exposed from the cylindrical member 202 are located below the hole of the sample stage 602. When the sample 402 is being irradiated with X-rays by the X-ray fluorescence spectrometer, X-rays traveling in various directions are present inside a measurement chamber. X-rays are mainly applied to the sample 402 (intensity of X-rays is high), and X-rays are rarely applied to a lower side of the hole of the sample stage 602 (intensity of X-rays is low). Accordingly, the intensity of X-rays applied to the exposed pressed portions 226 is low. Hence, according to the configuration of the present disclosure, deterioration of the resin member 208 due to X-rays can be reduced. In addition, with the bottom plate 210 covering a lower surface of the sample holder 100, contamination inside the X-ray fluorescence spectrometer due to, for example, powder peeled or chipped off from the sample 402, can be prevented.

REFERENCE SIGNS LIST 100 sample holder, 202 cylindrical member, 204 saucer, 206 elastic member, 208 resin member, 210 bottom plate, 212 tubular body, 214 upper surface body, 216 exposure portion, 218 claw portion, 220 bow part, 222 base part, 224 curved portion, 226 pressed portion, 228 locking portion, 230 hole formed in bottom plate, 302 screw hole, 402 sample, 404 fitting portion, 602 sample stage

The invention claimed is:
1. A sample holder for X-ray fluorescence analysis, comprising:
a cylindrical member having an upper end surface with a hole partially formed therein, and a lower end which is opened;
a saucer, which is arranged inside the cylindrical member, and on which a sample is to be placed;
an elastic member configured to urge the saucer upward;
a resin member, which includes a bow part and is configured to come into contact with a lower end of the elastic member; and
a bottom plate arranged below the resin member,
wherein the cylindrical member, the saucer, and the bottom plate are each made of a metal,
wherein the bow part includes a claw portion provided at an end portion, and a pressed portion to be pressed inward, and is configured to be elastically deformed by pressing the pressed portion,
wherein the cylindrical member includes a fitting portion which allows the claw portion to be fitted to the fitting portion, and an exposure portion which allows the pressed portion to be exposed to an outside through the exposure portion, and
wherein the resin member is arranged between the saucer and the bottom plate, and portions of the resin member other than the pressed portion are surrounded by the cylindrical member, the saucer, and the bottom plate.

2. The sample holder according to claim 1, wherein the cylindrical member includes a tubular body having a cylindrical shape, and an upper surface body having a hole formed therein.

3. The sample holder according to claim 1, wherein the cylindrical member is integrally formed.

4. The sample holder according to claim 1, wherein the saucer includes, in a surface of the saucer on which the sample is to be placed, a recess portion on which the sample is to be placed.

5. The sample holder according to claim 1,
wherein the saucer includes a protruding portion on a bottom surface, and
wherein the elastic member has an upper end which is to be fitted onto the protruding portion of the saucer.

6. The sample holder according to claim 1,
wherein the resin member includes a locking portion having a claw-shape, and
wherein the elastic member has a lower end which is to be locked by the locking portion of the resin member.

7. The sample holder according to claim 1, wherein the cylindrical member, the saucer, and the bottom plate are each made of an alloy mainly containing aluminum.

8. The sample holder according to claim 1, wherein the fitting portion is a recess which allows the claw portion to be fitted into the recess.

9. The sample holder according to claim 1, wherein the exposure portion is a cutout which allows the pressed portion to be exposed to the outside through the cutout.

* * * * *